United States Patent [19] [11] 4,419,494
Puletti et al. [45] Dec. 6, 1983

[54] HEAT RESISTANT HOT MELT ADHESIVES

[75] Inventors: Paul P. Puletti, Glen Gardner; Catherine Stubler Salerno, Stirling both of N.J.

[73] Assignee: National Starch and Chemical Corporation, Bridgewater, N.J.

[21] Appl. No.: 358,758

[22] Filed: Mar. 16, 1982

[51] Int. Cl.³ .................. C08L 93/00; C08L 93/04; C08J 25/00
[52] U.S. Cl. .................. 525/95; 524/272; 524/271; 524/274; 156/DIG. 21
[58] Field of Search .......... 524/272, 271, 274; 525/95

[56] References Cited

U.S. PATENT DOCUMENTS

| | | | |
|---|---|---|---|
| 3,239,478 | 3/1966 | Harland, Jr. | 428/349 |
| 3,427,269 | 2/1969 | Davis et al. | 524/271 |
| 3,449,273 | 6/1969 | Kettenring et al. | 524/324 |
| 3,582,507 | 6/1971 | Peerman | 524/514 |
| 3,645,932 | 2/1972 | Harrison et al. | 525/184 |
| 3,700,633 | 10/1972 | Wald et al. | 525/339 |
| 3,753,936 | 8/1973 | Marrs | 428/521 |
| 3,837,994 | 9/1974 | Flanagan et al. | 428/122 |
| 3,847,875 | 11/1974 | Drawert et al. | 528/338 |
| 3,917,607 | 11/1975 | Crossland et al. | 524/478 |
| 3,932,327 | 1/1976 | Naylor | 524/271 |
| 4,028,292 | 6/1977 | Korpman | 524/203 |
| 4,055,525 | 10/1977 | Chong | 528/339.5 |
| 4,212,910 | 7/1980 | Taylor et al. | 428/35 |
| 4,259,220 | 3/1981 | Bunnelle et al. | 525/98 |

Primary Examiner—John Kight, III
Assistant Examiner—M. L. Moore
Attorney, Agent, or Firm—Edwin M. Szala; Ellen T. Dec

[57] ABSTRACT

Conventional hot melt adhesive formulations based on A-B-A type block copolymers are improved with respect to their heat and plasticizer resistance by addition thereto of a polymeric fatty acid polyamide.

11 Claims, No Drawings

HEAT RESISTANT HOT MELT ADHESIVES

BACKGROUND OF THE INVENTION

I. Field of the Invention:

The present invention is directed to adhesive compositions containing rubbery block copolymers which adhesives are improved with respect to their heat resistance by the addition thereto of specific polyamide resins.

II. Brief Description of the Prior Art

Adhesive compositions based on elastomeric block copolymers have long been known in the art and are represented by U.S. Pat. Nos. 3,239,478; 3,932,327; 3,427,269; 3,700,633; 3,753,936; 3,837,994; 4,136,699; 4,212,910, and 4,259,220 among others. While these adhesives are suitable for many purposes, they may lack a combination of critical properties which limit their broader commercial utilization. In particular, some adhesive compositions are deficient in adhesive characteristics at relatively high temperatures. For many purposes, it is desirable that an adhesive function satisfactorily not only at room temperature but at substantially higher temperatures, on the order of 80°–150° F. In other situations, wherein the intended use of the adhesive is for applications to surfaces containing substantial amounts of plasticizer, many of these elastomeric block copolymer adhesives are deficient and do not have adequate resistance to plasticizers, particularly when exposed to elevated temperatures.

Attempts to improve heat resistance and plasticizer resistance of these adhesives have been made by including conventional tackifying resins in the formulations; however, this approach has proven inadequate. Other attempts to overcome these problems are taught in U.S. Pat. Nos. 3,935,338 and 3,917,607 wherein specific resins, such as coumarone-indene resins, which serve to reinforce the end blocks of the block copolymer resins are employed. Not only did the use of the latter types of resins fail to provide sufficient heat resistance for many end uses, but their use also resulted in an appreciable reduction in the tack of the adhesive composition itself.

SUMMARY OF THE INVENTION

We have now found that the addition to conventional hot melt adhesives based on elastomeric block copolymers of a polymeric fatty acid polyamide substantially improves the performance properties of the adhesive, particularly with respect to heat and plasticizer resistance.

In its broadest aspect, the present invention is directed to hot melt adhesive compositions comprising 10–55% of a rubbery block copolymer having the general configuration A-B-A wherein A is a non-elastomeric polymer block derived from the moieties of a monovinyl aromatic hydrocarbon monomer, and B is an elastomeric polymer block derived from the moieties of a conjugated diene monomer or hydrogenated derivatives thereof; 1–20% of a polymeric fatty acid polyamide; 20–70% of a tackifying resin; 0–25% parts plasticizing oil; 0–50% of wax diluent and 0–3% of antioxidant. All are by weight.

It will be recognized that the general formula described above can be adapted to include a wide variety of hot melt adhesive compositions, the more precise formulations of which will vary depending upon the specific end use, the knowledge of which is readily available to those skilled in the particular art. Representative formulations and applications therefor will be discussed hereinbelow and illustrated by the examples; however, these should not be construed as limiting the invention.

DETAILED DESCRIPTION OF THE PREFERRED EMBODIMENTS

The primary component of the adhesive compositions of the present invention are block copolymers having the general configuration:

A-B-A wherein the polymer blocks A are non-elastomeric polymer blocks which, as homopolymers have glass transition temperatures above 20° C., while the center elastomeric polymer blocks are derived from at least one conjugated diene such as butadiene or isoprene. These mid-blocks may, if desired, be partially or substantially hydrogenated. Further, they may be linear or branched. Typical branched structures contain a mid-block portion with at least three branches which can radiate out from a central hub or can be otherwise coupled together.

While the specific molecular weight of the block copolymer prepared from the conjugated diene and the plastic terminal blocks may be varied for specific end uses, it is preferred that the elastomeric center blocks have an average molecular weight from about 15,000 to about 250,000, preferably 24,000–150,000, and that they comprise from 14 to 86% by weight of the entire block copolymer. The terminal blocks which comprise the remaining 86–14% of the copolymer are those having average molecular weights between 5,000 and 125,000, preferably 15,000–100,000. These terminal blocks are prepared by polymerization of vinyl monomers and/or acrylic monomers and should have glass transition temperatures above about 50° C., the difference in glass transition temperature between that of the center block and of the end blocks should be greater than about 100° C.

The non-elastomeric end blocks may comprise homopolymers or copolymers of vinyl monomers such as vinyl arenes, vinyl pyridines, vinyl halides and vinyl carboxylates, as well as acrylic monomers such as acrylonitrile, methacrylonitrile, esters of acrylic acids, etc. Monovinyl aromatic hydrocarbons include particularly those of the benzene series such as styrene, vinyl toluene, vinyl xylene, ethyl vinyl benzene as well as dicyclic monovinyl compounds such as vinyl naphthalene and the like. Other non-elastomeric terminal polymer blocks may be derived from alpha olefins, alkylene oxides, acetals, urethanes, etc.

The center elastomeric blocks are prepared from conjugated dienes such as isoprene, butadiene, copolymers of styrene and butadiene as well as their homologues. Additionally, these elastomeric blocks may be hydrogenated as taught, for example, in U.S. Pat. No. 3,700,633.

The block copolymers may be modified if desired by hydrogenation which may be either partial or substantially complete. Selected conditions may be employed for example to hydrogenate the elastomeric diene center block while not so modifying the vinyl arene polymer blocks. Other conditions may be chosen to hydrogenate substantially uniformly along the polymer chain, both the elastomeric and nonelastomeric blocks thereof being hydrogenated to practically the same extent, which may be either partial or substantially complete.

Typical of the rubbery block copolymers useful herein are the polystyrene-polybutadiene-polystyrene, polystyrene-polyisoprene-polystyrene, poly(aphamethyl-styrene)-polybutadiene-poly(alpha-methyl-styrene), poly(alpha methyl styrene)-polyisoprene-poly(alpha methyl styrene), as well as the hydrogenated modifications thereof, e.g. polystyrene-poly(ethylene-butylene)-polystyrene. These copolymers may be prepared using methods taught, for example, in U.S. Pat. Nos. 3,239,478; 3,427,269; 3,700,633; 3,753,936; and 3,932,327. Alternatively, some may be obtained from Shell Chemical Co. under the trademarks Kraton 1101, 1102, 1107, 1111, 1650, 1652 and 1657 and from Phillips Chemical Co. under the trademarks Solprene 418 and 423. We have also found that for specific applications blends of two or more of the block copolymers may be beneficial. In particular, blends of 1 part of the polystyrene-polyisoprene-polystyrene copolymer to 4 or 5 parts of the polystyrene-polybutadiene-polystyrene copolymer have been found useful in the present invention.

The polymeric fatty acid polyamide resins are generally prepared by reaction under conventional amidification conditions of a polymeric fatty acid or mixtures thereof with other dicarboxylic acids with a diamine or mixtures thereof with alkanolamines.

The term "fatty acids" as used herein is intended to include saturated, ethylenically unsaturated and acetylenically unsaturated naturally occurring and synthetic monobasic aliphatic acids containing from 8 to 24 carbon atoms. Suitable saturated fatty acids include branched and straight chain acids such as caprylic acid, perlargonic acid, capric acid, lauric acid, myristic acid, palmitic acid, isopalmitic acid, stearic acid, arachidic acid, behenic acid and lignoceric acid. Suitable ethylenically unsaturated acids include the branched or straight chain, poly- and mono-ethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timinodimic acid, eicosatetraenoic acid, nisinic acid, scoliodonic acid and chaulmoogric acid. Any acetylenically unsaturated fatty acid, both straight and branched chain, both mono-unsaturated and polyunsaturated, are useful herein. Suitable examples of such materials include 10-undecynoic acid, tariric acid, stearolic acid, behenolic acid and isamic acid.

Because of their ready availability and relative ease of polymerization, oleic and linoleic acids are the preferred starting materials for the preparation of polymeric fatty acids. Mixtures of these two acids are found in tall oil fatty acids and, accordingly, commercial tall oil fatty acids are the common source for preparing the polymeric fatty acids used herein.

The diamines employed in the preparation of the polyamides have the general formula

where $R^1$ is an aliphatic, cycloaliphatic, araliphatic or aromatic hydrocarbon radical having from 2 to 40 carbon atoms and may be straight or branched chain. Preferably $R^1$ is an alkylene radical having from 2 to 12 carbon atoms. Illustrative of the diamines which may be employed are 1,2-diaminoethane, 1,3-diaminopropane, 1,4-diaminobutane, 1,6-diaminohexane, 1,10-diaminodecane, 1,12-diaminododecane, 1,18-diaminooctadecane, bis(aminomethyl) benzene, bis(aminoethyl) benzene, cyclohexyl bis(methylamine), xylylene diamine, methylene dianiline, and the diamine of a dimeric fat acid, hereinafter referred to as dimer diamine. In the dimer diamine prepared from a polymerized $C_{18}$ acid such as oleic or linoleic acid, or mixtures thereof found in tall oil fatty acids, $R^1$ will contain 36 carbon atoms. In addition, $R^1$ may be branched as in 3,4-diethyl-1,6-diamino-hexane, 3-ethyl-1,8-diaminooctane, 2-nonyl-1,10-diaminodecane and 2-octyl-1,11-diaminoundecane.

A portion of the diamine may be replaced by an alkanolamine such as those having the general formula $$H_2N-R^2-OH$$

where $R^2$ is a divalent aliphatic hydrocarbon radical having from 2 to 8 carbon atoms and preferably an alkylene radical having from 2 to 8 carbon atoms. Illustrative thereof are ethanolamine, propanolamine, butanolamine, 2-amino-3-hexanol, 2-amino-4-pentanol 5-amino-4-octanol and 3-amino-3-methyl-2-butanol. $R^2$ may be straight or branched chain.

Diamines which are interrupted by oxygen atoms in the chain (also called ether diamines) and which are also, however, suitable can be represented by the general formula:

$$H_2N-(CH_2)_n-O-(R^3 O)_x-(CH_2)_n-NH_2$$

where n can be a number from 3 to 5, x can have a value of 0, 1, 2, or 3, and where $R^3$ is an alkyl group with a chain length of 1 to 12 carbon atoms, which may also carry alkyl substitutents of 1 to 4 carbon atoms.

Examples of ether diamines of the general formula are: 1,7-diamino-4-oxoheptane, 1,11-diamino-6-oxoundecane, 1,7-diamino-3,5-dioxoheptane, 1,10-diamino-4,7-dioxoundecane, 1,10-diamino-4,7-dioxo-5-methyldecane, 1,11-diamino-4,8-dioxoundecane, 1,11-diamino-4,8-dioxo-5-ethylundecane, 1,12-diamino-4,9-dioxododecane, 1,13-diamino-4,10-dioxotridecane, 1,15-diamino-4,11-dioxotetradecane, 1,11-diamino-4,8-dioxo-5,6-dimethyl-7-propionyl undecane, 1,14-diamino-4,7,10-trioxotetradecane, 1,13-diamino-4,7,10-trioxo-5,8-dimethyltridecane, 1,20-diamino-4,17-dioxocicosane, 1,16-diamino-4,7,10,13-tetraoxohexadecane.

Other dicarboxylic acids which may optionally be employed along with the polymeric fatty acid are those having the formula

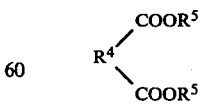

where $R^4$ is aliphatic, cycloaliphatic, araliphatic or aromatic hydrocarbon radical having from 2 to 20 carbon atoms and $R^5$ is hydrogen or a lower aliphatic hydrocarbon radical having from 1 to 8 carbon atoms such as methyl, ethyl, propyl, butyl, hexyl and octyl. The preferred range of these acids is where $R^4$ is from 2 to 8 carbon atoms such as adipic, succinic, glutaric, pimelic, suberic, azelaic, sebacic, terephthalic, isophthalic, cyclohexane dicarboxylic acid, cyclohexane diacetic acid and the like.

Where the homopolymer polyamides are desired, essentially equivalent amounts of amine and carboxyl are employed. Where the other dicarboxylic acid is employed, the carboxyl equivalent ratio of polymeric fatty acids to other dicarboxylic acid (adipic, sebacic, or mixtures thereof) is preferably varied from about 1:0.05 to 1:0.5. The amount of diamine and/or alkanolamine must be varied based on the relative amount of carboxylic acid present. The equivalents of carboxylic acid are essentially equal to the amine and hydroxyl equivalents (where alkanolamine is present). The molar equivalent ratio of alkylene diamine to alkanolamine is preferably varied from about 20:1 to 1:2, and preferably in the range of about 10:1 to 1:1.

Suitable polymeric fatty acid polyamides and their preparation are described, for example in U.S. Pat. Nos. 3,157,681 and 3,449,273 or they may be obtained from General Mills (Henkel) under the tradenames "Versamid", "Versalon" and "Macromelt" or from other suppliers including Emery as "Emerez" or Union Camp as "Uni Rez".

As contemplated in this invention, the term "tackifying resin" includes (1) natural and modified rosins such, for example, as gum rosin, wood rosin, tall-oil rosin, distilled rosin, hydrogenated rosin, dimerized rosin, and polymerized rosin; (2) glycerol and pentaerythritol esters of natural and modified rosins, such, for example, as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) polyterpene resins having a softening point, as determined by ASTM method E28-58T, of from about 80° to 150° C.; the latter polyterpene resins generally resulting from the polymerization of terpene hydrocarbons, such as the bicyclic monoterpene known as pinene, in the presence of Friedel-Crafts catalysts at moderately low temperatures; also included are the hydrogenated polyterpene resins; (4) chlorinated terphenyl resins containing from about 42 to 60% by weight, of chlorine; (5) phenolic-modified terpene resins such, for example, as the resin product resulting from the condensation, in an acidic medium, of a bicylic terpene and a phenol; (6) aliphatic petroleum hydrocarbon resins having a Ball and Ring softening point of from about 70° to 135° C.; the latter resins resulting from the polymerization of monomers consisting of primarily of olefins and diolefins; also included are the hydrogenated aliphatic petroleum hydrocarbon resins; (7) aromatic petroleum hydrocarbon resins and the hydrogenated derivatives thereof; and (8) alicyclic petroleum hydrocarbon resins and the hydrogenated derivatives thereof. Mixtures of two or more of the above described tackifying resins may be required for some formulations.

Among the applicable antioxidants (stabilizers) utilized herein are included high molecular weight hindered phenols and multifunctional phenols such as sulfur and phosphorus-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxy group. The presence of these sterically bulky substituted radicals in the vicinity of the hydroxyl group serves to retard its stretching frequency and, correspondingly, its reactivity; this steric hindrance thus providing the phenolic compound with its stabilizing properties. Representative hindered phenols include:

1,3,5-trimethyl-2,4,6-tris (3,5-di-tert-butyl-4-hydroxybenzyl)benzene;

pentaerythrityl tetrakis-3(3,5-di-tert-butyl-4-hydroxyphenyl)propionate;

n-octadecyl-3(3,5-di-tert-butyl-4-hydroxyphenyl)-propionate;

4,4'-methylenebis (2,6-di-tert-butylphenol);

2,2'-methylenebis (4-methyl-6-tert-butylphenol);

4,4'-thiobis (6-tert-butyl-o-cresol);

2,6-di-tert-butylphenol;

6-(4-hydroxyphenoxy)-2,4-bis(n-octylthio)-1,3,5-triazine;

2,4,6-tris-(4-hydroxy-3,5-di-tert-butylphenoxy)-1,3,5-triazine;

di-n-octadecyl 3,5-di-tert-butyl-4-hydroxy-benzylphosphonate;

2-(n-octylthio)ethyl 3,5-di-tert-butyl-4-hydroxybenzoate; and sorbitol hexa-[3-(3,5-di-tert-butyl-4-hydroxy-phenyl)-propionate].

The performance of these antioxidants may be further enhanced by utilizing, in conjunction therewith; (1) synergists such, for example, as thiodipropionate esters and phosphites; and (2) chelating agents and metal deactivators such, for example, as ethylenediamine tetraacetic acid, salts thereof, and disalicylalpropylenediimine.

Depending on the end-use application, and particularly for uses requiring pressure sensitive properties, various plasticizing or extending oils may also be present in the composition. This term broadly encompasses not only the usual plasticizing oils for rubbers prepared from petroleum fractions but also contemplates the use of olefin oligomers and low molecular weight polymers as well as vegetable and animal oil and their derivatives. The petroleum derived oils which may be employed are relatively high boiling materials containing only a minor proportion of aromatic hydrocarbons (preferably less than 30% and, more particularly, less than 15% by weight of the oil). The oil may be totally non-aromatic. Preferably the petroleum oils contain between about 30 and 45% naphthenic carbon atoms, between 35 and 65% by weight of paraffinic carbon atoms, the balance being aromatic carbon atoms and have number average molecular weights between about 300 and 1,400. The oligomers may be polypropylenes, polybutenes, hydrogenated polyisoprene, hydrogenated polybutadiene, or the like having average molecular weights between about 350 and about 10,000. Vegetable and animal oils include glyceryl esters of the usual fatty acids and polymerization products thereof.

Other applications conventionally employing adhesives based on these elastomeric block copolymer resins require the use of wax diluents in order to reduce the melt viscosity or cohesive characteristics of the hot melt adhesive compositions without appreciably decreasing their adhesive binding characteristics. These waxes are typically used in adhesives which do not exhibit pressure sensitive properties. Among the applicable wax diluents are included: (1) low molecular weight, e.g. 1000-6000, polyethylene having a hardness value, as determined by ASTM method D-1321, of from about 0.1 to 120 and an ASTM softening point of from about 150°–250° F.; (2) petroleum waxes such as paraffin wax having a melting point of from about 130° to 165° F. and microcrystalline wax having a melting point of from about 140° to 200° F.; the latter melting points being determined by ASTM method D127-60; (3) atactic polypropylene having a Ball and Ring softening point of from about 120° to 160° C.; and synthetic waxes made by polymerizing carbon monoxide and hydrogen such as Fischer-Tropsch wax. Each of these wax diluents is solid at room temperatures. Hydrogenated animal, fish and vegetable fats and oils such as hydrogenated tallow, lard, soya oil, cottonseed oil, castor oil, menhadin oil, cod liver oil, etc., are solid materials at ambient temperature by virtue of their being hydrogenated and are also found to be useful to function as the wax diluent equivalent. These hydrogenated materials are often referred to in the adhesive industry as "animal or vegetable waxes."

While it will be recognized that a wide range of adhesive formulations are included within the scope of the present invention, it may generally be stated that these adhesives will comprise 10–55, preferably 15–35% of the rubbery block copolymer; 1–20, preferably 3–15%, of the polymeric fatty acid polyamide; 20–70, preferably 40–60%, tackifying resin and 0–3% of antioxidant. In the embodiments wherein wax or oil is used the wax is generally present in an amount of 10–50, preferably 20–40%, and the oil in an amount of 1–25, preferably 5–10%. Furthermore, optional additives conventionally used in these elastomeric hot melt adhesives may be utilized herein to modify certain properties. Among these additives may be included colorants such as titanium dioxide and fillers such as talc and clay, etc. Additionally, other polymers conventionally known and used in A-B-A rubbery block copolymer type hot melt adhesives may also be present in the compositions of the present invention.

It will be recognized by one skilled in the art that the specific resins chosen, i.e. the rubbery block copolymer, polymer fatty acid polyamide and tackifying resin, should be mutually compatible so as to ensure the production of a homogeneous hot melt product.

The procedure for preparing these hot melt adhesive compositions involves placing the block copolymer, the polyamide, antioxidant and any optional fillers in a jacketed mixing kettle, preferably in a jacketed heavy duty mixer of the Baker-Perkins or Day type, which is equipped with rotors and thereupon raising the temperature to a range of from about 250° to 350° F., the precise temperature utilized depending on the melting point of the resins employed. After the initial melting and mixing, the tackifying resin(s) is added and mixing continued. Toward the end of the mixing cycle, any oil or wax which is to be used is added and the heating and mixing continued until a smooth homogeneous mass is obtained. The procedure is modified slightly in the case of adhesive containing the hydrogenated block copolymer since these copolymers may require the presence of oil or wax in the initial charge to facilitate melting.

The resulting hot melt composition is drawn off and may be used immediately in hot pots; or, it may be molten-extruded into rope form or converted into pellets, rods, cylinders, slugs or billets depending on the equipment which will be subsequently used to apply the hot melt during application thereof; or, it may be placed in cooling pans and held in bulk form for later use; or, it may be granulated or diced.

While the addition of polymeric fatty acid polyamides in accordance with the present invention would provide a benefit to virtually any hot melt adhesive containing A-B-A type elastomeric block copolymers, there are certain formulations which, by virtue of the requirements of their end-use applications, will benefit to a greater extent.

In particular, we have found the use of polymeric fatty acid polyamides substantially improves the heat resistance and tensile strength characteristics of A-B-A based adhesives useful for bonding leg band natural rubber elastics, polyurethane rubber elastics, or other natural or synthetic rubber elastics to polyethylene surfaces in the manufacture of disposable diapers. Adhesives especially adapted for these end-uses generally comprise 10–40% of the A-B-A copolymer, 20–50% of at least one tackifying resin, 1–25% of a plasticizing oil, 3–15% of the polyamide, 0.5–3% antioxidant and minor amount of filler. Similarly, improvements with respect to heat resistance and tensile strength are seen by the addition of 3–15% of a polyamide resin to the viscoelastic hot melt pressure sensitive adhesives of the type described in U.S. Pat. No. 4,259,220 which comprise 33–55% of a poly(vinylarene)-polyisoprene-poly(vinylarene) copolymer, 25–45% of a terpene tackifying resin and 10–30% of a hydrocarbon resin.

Other formulations useful for a variety of product assemblies which may benefit from the addition of polymeric fatty acid polyamides are formulations comprising, for example, 20–50% of the A-B-A rubbery block copolymer, 20–60% of at least one tackifying resin, 20–50% of a wax diluent and 0.5–3% of an antioxidant.

The utilization of polymeric fatty acid polyamides in accordance with the teachings of the present invention also facilitate the use of elastomeric block copolymer type adhesives in applications, such as in the production of pressure sensitive vinyl decals, wherein other adhesives (e.g. acrylates) were conventionally employed due to the poor plasticizer resistance of presently available block copolymer adhesives.

The following example, in which all parts are expressed by weight, are submitted to illustrate preferred embodiments of the invention and are not to be considered as limiting the scope thereof.

In the following examples, tensile strength and heat resistance were tested as follows:

Tensile Strength at 100% Elongation: This property was determined using a molded tensile bar of the adhesive having a cross sectional area of 0.05–0.0875 in.$^2$ The tensile strength at 100% elongation was measuring using a Instron Tensile Tester with the following conditions:

| | |
|---|---|
| Chart speed: | 12 inches/minute |
| Cross-Head Speed: | 5 inches/minute |
| Jaws (initial separation): | 0.5 inches |
| Load Cell: | CT cell (5–200 lb.) |
| Testing Temperature: | 21° C. and 55° C. |
| Values reported at 100% elongation | |

Heat Resistance: A ten mil transfer coating of the adhesive was made and a 1.0×1.0 inch strip of the adhesive was used to form a Kraft paper to Kraft paper bond which was sealed at 275° F. using 25 psi pressure for 1.0 seconds. The bond was allowed to age 24 hours and then tested in an oven in shear mode with 100 g load. Oven temperature was raised in 10° F.

increments every 15 minutes. Time and temperature of bond failure was reported.

EXAMPLE I

A Baker-Perkins jacketed reactor vessel was heated to 350° F. and charged with the elastomeric block copolymer(s), polyamide, and antioxidant in the proportions given in Table I. After 10 minutes mixing, the hydrocarbon resin was added and mixing continued for 5 minutes after which the rosin ester was added and mixed for another 10 minute period. Finally, the mineral oil was added and mixing continued about 10 minutes until a uniform melt was produced.

Samples of each of the hot melt adhesives were then tested for tensile strength and heat resistance using the methods described above. Results of the tests are shown in Table I.

tions which do not contain the polymeric fatty acid polyamide.

EXAMPLE III

A comparative example was performed showing the superior tensile strength and heat resistant properties achieved with the use of polyamide according to the present invention as contrasted to using a coumarone-indene resin of the prior art.

TABLE III

| | | |
|---|---|---|
| Kraton 1102 | 30.0 | 30.0 |
| Kraton 1111 | 5 | 5 |
| Macromelt 6240 | — | 8.1 |
| Cumar (LX-509) | 8.1 | — |
| Foral 105 | 38.5 | 38.5 |
| Escorez 5320 | 20 | 20 |
| Mineral Oil | 5 | 5 |
| Antioxidant | 2 | 2 |
| Test Results | | |
| Heat Resistance | 7 min. @ 170° F. | 11 min. @ 180° F. |
| Tensile Strength at 100% Elongation | | |
| at 21° C. | 51 psi | 62 psi |
| at 55° C. | 9 psi | 19 psi |

TABLE I

| | Parts by weight | | | |
|---|---|---|---|---|
| Ingredients | | | | |
| Kraton 1102 (Polystyrene-polybutadiene-polystyrene copolymer) | 30 | 30 | 30 | 30 |
| Kraton 1111 (Polystyrene-polyisoprene-polystyrene copolymer) | 5 | 5 | 5 | 5 |
| Macromelt 6240* | 0 | 5.3 | 8.1 | 11.1 |
| Foral 105 (Pentaerythritol ester of rosin) | 38.5 | 38.5 | 38.5 | 38.5 |
| Escorez 5320 (Hydrocarbon resin) | 20 | 20 | 20 | 20 |
| Mineral Oil | 5 | 5 | 5 | 5 |
| Antioxidant | 2 | 2 | 2 | 2 |
| Test Results | | | | |
| Heat Resistance | 10 min. @ 170° F. | 6 min. @ 180° F. | 11 min. @ 180° F. | 5 min. @ 190° F. |
| Tensile Strength at 100% Elongation | | | | |
| at 21° C. | 20 psi | 43 psi | 62 psi | 78 psi |
| at 55° C. | 11 psi | 18 psi | 19 psi | 20 psi |

*An amine terminated polymeric fatty acid polyamide derived from tall oil and available from Henkel.

EXAMPLE II

Other examples representative of formulations of the present invention may be prepared using the ingredients and amounts shown in Table II.

TABLE II

| | | | | | | |
|---|---|---|---|---|---|---|
| Kraton 1102 | — | 25 | 25 | — | 32 | — |
| Kraton 1111 | 30 | 5 | 5 | — | — | — |
| Kraton 1650 (Polystyrene-polyethylene-butylene-polystyrene) | — | — | — | 27.5 | — | — |
| Solprene 418 (branched isoprene-styrene block copolymer) | — | — | — | — | — | 35 |
| Macromelt 6238* | — | .5 | — | — | — | 5 |
| Macromelt 6240 | 5 | — | 5 | 7.5 | 5 | — |
| Glycerol Ester of Hydrogenated Rosin | — | — | — | — | 45 | 35 |
| Foral 105 | 38.5 | 38.5 | 43.5 | 38.5 | — | — |
| Escorez 5320 | 20 | 20 | 20 | 20 | — | — |
| Mineral Oil | 5 | 5 | — | 5 | — | — |
| Paraffin Wax (mp. 150–155° F.) | — | — | — | — | 25 | 30 |
| Antioxidant | 2 | 2 | 2 | 2 | 1.8 | 1.8 |

*An acid terminated polymeric fatty acid polyamide derived from tall oil.

When tested as described above these compositions will also exhibit properties at elevated temperatures superior to those demonstrated by comparable formulations.

As can be seen from the above test results, the addition of the coumarone-indene resin, while providing some beneficial properties with respect to tensile strength at room temperature (when contrasted with the formulation shown in Table I which contained no polyamide), exhibited a detrimental effect on the adhesive on exposure to elevated temperatures.

We claim:

1. A hot-melt adhesive composition with improved heat resistance comprising 10–55% of a block copolymer having the general configuration A-B-A wherein A is a non-elastomeric polymer block derived from the moieties of a monovinyl aromatic hydrocarbon monomer, and B is an elastomeric polymer block derived from the moieties of a conjugated diene monomer or a hydrogenated derivative thereof; 20–70% of a tackifying resin; 0–25% plasticizing oil; 0–50% wax diluent; and 0–3% antioxidant; wherein the improvement comprises the present of 1–20% of a polymeric fatty acid polyamide.

2. The hot melt adhesive composition of claim 1 wherein the block copolymers are selected from the group consisting of polystyrene-polybutadiene-polystyrene, polystyrene-polyisoprene-polystyrene, poly(alpha methyl styrene)-polybutadiene-poly(alpha methyl styrene), poly(alpha methyl styrene)-polyisoprene-poly(alpha methyl styrene), as well as the hydrogenated modifications thereof.

3. The hot melt adhesive composition of claim 1 wherein the block copolymer is a mixture of 1 part of polystyrene-polyisoprene-polystyrene copolymer to 4–5 parts of polystyrene-polybutadiene-polystyrene copolymer.

4. The hot melt adhesive composition of claim 1 wherein the polymeric fatty acid polyamide is prepared by amidification of a polymeric fatty acid or mixture thereof with dicarboxylic acids with a diamine or mixture thereof with alkanolamine.

5. The hot melt adhesive composition of claim 4 wherein the polymeric fatty acid is derived from a tall oil fatty acid.

6. The hot melt adhesive composition of claim 1 wherein the block copolymer is present in an amount of 15–35%; the polymeric fatty acid polyamide in an amount of 3–15%; the tackifying resin in an amount of 40–60% and the antioxidant in an amount of 0.5–3%.

7. The hot melt adhesive composition of claim 1 wherein the wax diluent is present in an amount of 20–40%.

8. The hot melt adhesive composition of claim 1 wherein the plasticizing oil is present in an amount of 5–10%.

9. A hot-melt adhesive composition with improved heat resistance comprising 10–40% of a block copolymer having the general configuration A-B-A wherein A is a non-elastomeric polymer block derived from the moieties of a monovinyl aromatic hydrocarbon monomer, and B is an elastomeric polymer block derived from the moieties of a conjugated diene monomer or hydrogenated derivative thereof; 30–50% of a tackifying resin selected from the group consisting of natural and modified rosins and the glycerol and pentaerythritol esters of natural and modified rosins; 15–25% of an aliphatic petroleum hydrocarbon resin having a Ball and Ring softening point of from 70°–135° C.; 1–25% plasticizing oil; and 0.5–3% antioxidant; wherein the improvement comprises the presence of 3–15% of a polymeric fatty acid polyamide.

10. A hot-melt adhesive composition with improved heat resistance comprising 33–55% of a poly(vinylarene)-polyisoprene-poly(vinylarene) copolymer; 25–45% of a terpene tackifying resin; and 10–30% of a hydrocarbon resin; wherein the improvement comprises the presence of 3–15% of a polymeric fatty acid polyamide.

11. A method of improving the heat resistance of hot melt adhesives containing A-B-A type rubbery copolymer, wherein the improvement comprises the step of adding thereto 1–20% of a polymeric fatty acid polyamide.

* * * * *